US008819806B2

(12) United States Patent
Lin et al.

(10) Patent No.: US 8,819,806 B2
(45) Date of Patent: Aug. 26, 2014

(54) INTEGRATED DATA ACCESS

(75) Inventors: Chi-Hwei Julie Lin, Somerville, MA (US); Tsehsin Jason Liu, Wellesley, MA (US); Wei Miao, Cambridge, MA (US); Yunyan Wang, Framingham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1152 days.

(21) Appl. No.: 11/584,098

(22) Filed: Oct. 20, 2006

(65) Prior Publication Data
US 2008/0098486 A1 Apr. 24, 2008

(51) Int. Cl.
*H04L 29/06* (2006.01)
*G06F 21/62* (2013.01)

(52) U.S. Cl.
CPC .................. *G06F 21/6236* (2013.01)
USPC .......................................................... 726/12

(58) Field of Classification Search
CPC ........................ G06F 21/6236; H04L 63/104
USPC .......................................................... 726/8, 12
See application file for complete search history.

(56) References Cited

U.S. PATENT DOCUMENTS

| | | | |
|---|---|---|---|
| 5,764,890 A * | 6/1998 | Glasser et al. | 726/11 |
| 6,292,904 B1 * | 9/2001 | Broomhall et al. | 714/1 |
| 7,370,351 B1 * | 5/2008 | Ramachandran et al. | 726/8 |
| 2004/0203670 A1* | 10/2004 | King et al. | 455/414.3 |
| 2006/0161990 A1* | 7/2006 | Frey et al. | 726/26 |
| 2007/0079386 A1* | 4/2007 | Metzger et al. | 726/29 |
| 2007/0124482 A1* | 5/2007 | Lee et al. | 709/228 |
| 2007/0233804 A1* | 10/2007 | Palekar et al. | 709/208 |

* cited by examiner

*Primary Examiner* — Jeffrey D Popham

(57) ABSTRACT

An application portal selectively provides a user selective access to data. A data access layer is included in the portal and includes a map associating the user with a permission and further associating a combination of the user and the permission with a data entity, whereby it may be determined whether the user is permitted to access data identified with the data entity. A data stage included in the portal selectively undergoes a synchronization with a remote data store, the synchronization providing data access information that is used to update the map.

27 Claims, 6 Drawing Sheets

INTEGRATED DATA ACCESS

BACKGROUND INFORMATION

A typical enterprise computing environment includes multiple heterogeneous and distributed applications for accessing a variety of different systems covering different subject areas. For example, many enterprises such as businesses and the like have different systems to support customer billing, sales, accounting, inventory, ordering, procurement, technical support, field repairs, etc. Such different systems each generally have a dedicated application, e.g., a web application or a client server application, for accessing each of the different systems in an enterprise. Applications allowing users to access different systems are often incompatible with one another for a variety of reasons, particularly when, to begin with, such applications are not even part of the same enterprise.

In one common scenario, where an enterprise is the result of a merger or acquisition, the enterprise may have multiple unrelated systems for performing a single function. For example, the two companies joined by a merger may each have had their own systems for tracking repairs prior to the merger, and after the merger it may be impractical or difficult to combine the two systems. To take another example, an enterprise may have one system for provisioning or fulfilling new orders and another system for tracking repair requests, the two systems having been developed independently. However, it may often be the case that the same user, e.g., a customer, wishes to access multiple systems within an enterprise because multiple systems include data of interest to the user. Indeed, a customer's account information may be spread across multiple systems within the enterprise, e.g., repair, billing, provisioning, etc.

It is common for enterprises to have what is known as a portal, e.g., a web site, that is a single point of access, through which users both within and without the enterprise can access diverse applications and systems. Often, enterprises provide web pages with links to different applications. When a user selects such a link, the user is invited to log in to the selected application. In some cases, using a technique known as "account aggregation," the user may be permitted to provide to the portal login information for various applications. The portal then stores the user's login information for each of the various applications, and maps this login information to the user's login information for the portal.

However, to provide login information to the portal concerning each of the various enterprise applications that the user may need to access, means first that the user have a login account for each enterprise application that the user will access, and second that the user is aware of the enterprise application that the user needs to access. In many cases, users will not have the time or knowledge to provide such information to a portal. Accordingly, because present portals are able to allow users to view certain sets of data only according to application-specific login information, present portals make it difficult, if not impossible, for users to access data of interest to them. In general, present portals do not allow users to quickly and efficiently access the data that they wish to see, and do not create an interface to various systems within an enterprise that renders transparent to the user of the fact that all of these different systems exist.

DETAILED DESCRIPTION OF THE PREFERRED EMBODIMENTS

Figure 1A:
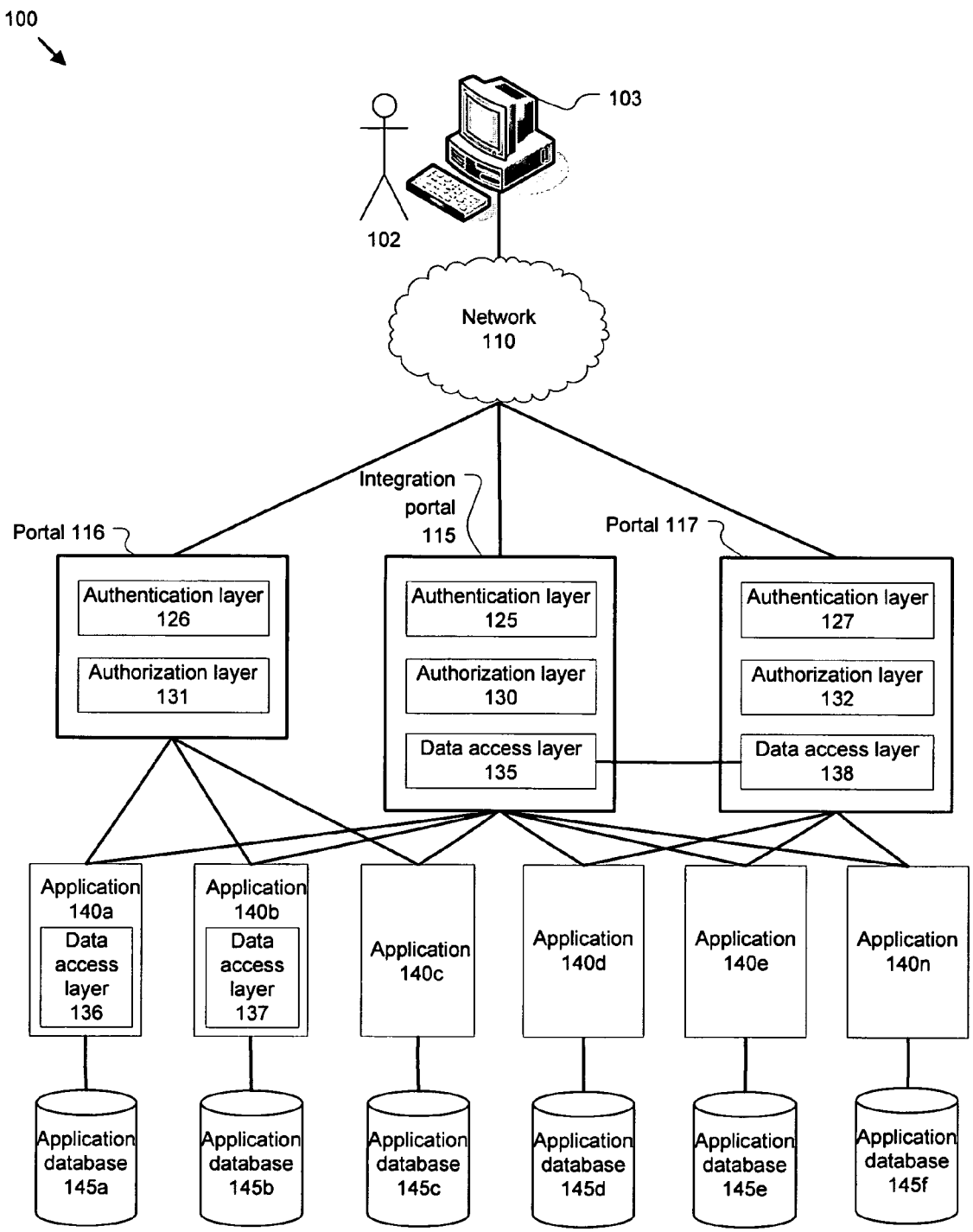
FIG. 1 illustrates an exemplary system for providing a user of a computing device with access to multiple applications within an enterprise through a portal.
FIG. 1B further illustrates an exemplary system for providing a user of a computing device with access to multiple applications within an enterprise through a portal.
Figure 1B:
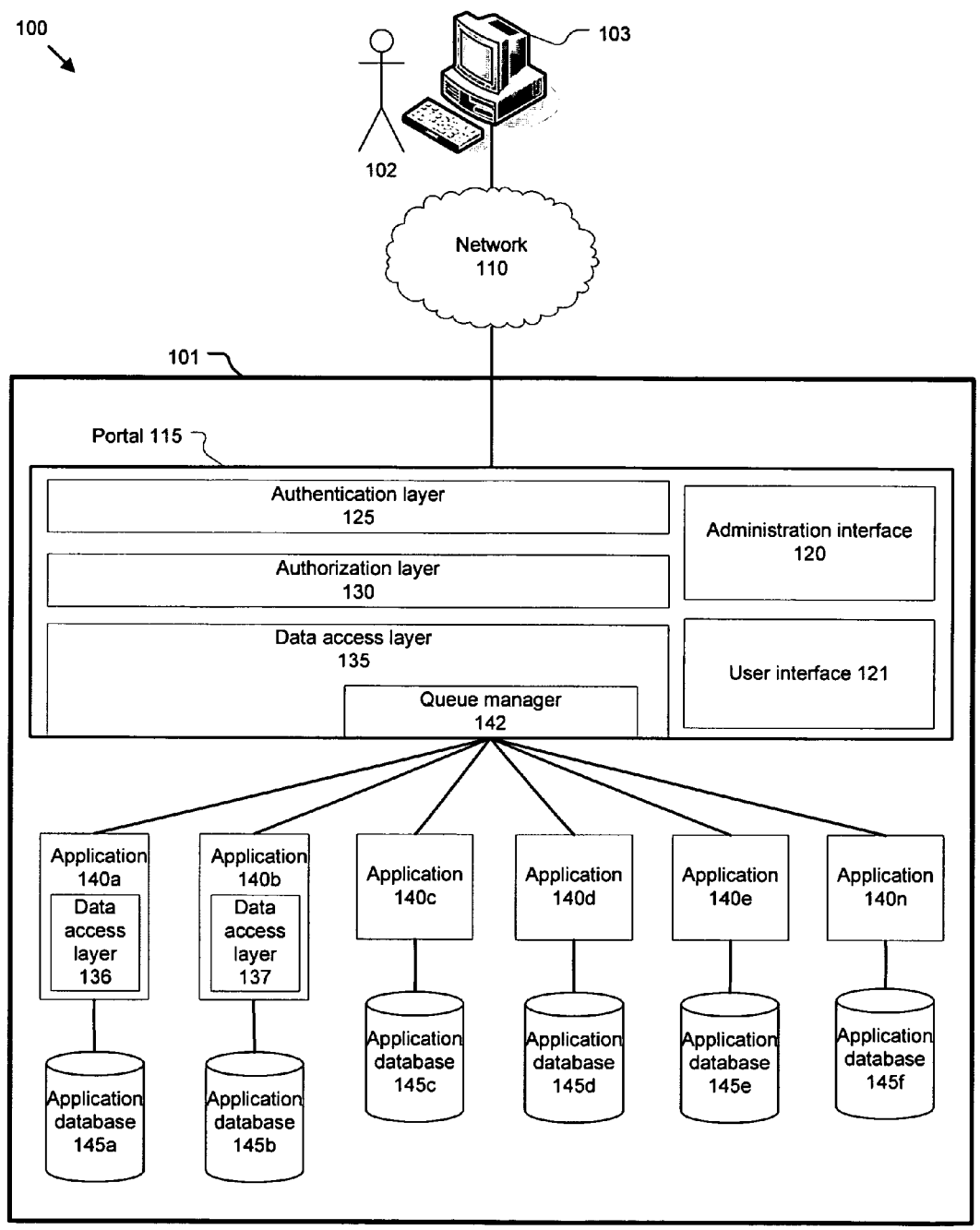

FIGS. 1A and 1B illustrate various aspects of an exemplary system 100 for providing user 102 of computing device 103 with access to multiple applications 140 through integration portal 115.

As seen in FIG. 1A, portals 116 and 117 provide access to one or more applications 140 that also are accessible through portal 115. In some cases, a portal 116 or 117 may be dedicated to a particular single application 140. In any case, each of the portals 116 and 117 are generally dedicated to a particular subset of applications 140. In general, the set of applications 140 available through portal 116 and a set of applications available through portal 117 do not overlap. Portal 115, on the other hand, provides a single, integrated point of access for user 102 to all applications 140.

Portals 116 and 117 are sometimes referred to as legacy portals because they generally, although not necessarily, pre-exist portal 115. Portal 115 may replace portals 116 and 117, although embodiments are possible and likely in which legacy portals 116 and 117 exist alongside portal 115, thereby providing user 102 with several ways in which to access an application 140. It should be understood that, although FIG. 1A shows two legacy portals 116 and 117, embodiments are possible in which integration portal 115 provides access to applications 140 that previously were, and perhaps currently are, accessed through three or more legacy portals such as exemplary portals 116 and 117. Further, in some embodiments some or all applications 140 may be accessed directly, e.g., by accessing a computing device on which application 140 is installed, through network 110, etc.

As seen in FIG. 1B, user 102 of computing device 103 may be provided with access to multiple applications 140 within enterprise 101 through portal 115. Enterprise 101 represents any enterprise, or any collection of enterprises, that includes multiple and disparate applications 140. In fact, enterprise 101 is depicted in FIG. 1B for purposes of illustration, and not limitation, and it should be understood that portal 115 may be used to provide access to any applications 140 that may be accessed through network 110 or some other network connected to portal 115, regardless of whether such applications 140 are included within enterprise 101.

Portal 115 and computer 103 are generally each connected to network 110, which may be any network capable of providing digital communications between portal 115 in computer 103, and is generally a packet switched network. For example, network 110 may be any combination of a local area network (LAN), a wide area network (WAN), or the Internet, etc. Accordingly, user 102 generally accesses portal 115 by using a Web browser or some other suitable client application that is installed on computer 103. As noted above, portals 116 and 117, and in some cases applications 140, may also be accessed through a network such as network 110.

Portal 115 generally includes peripheral devices such as a keyboard, a mouse or other pointing device, a display, etc. to facilitate administration of portal 115 through administration interface 120. Administration interface 120 is usually a graphical user interface (GUI) such as may be provided through a webpage accessible through a Web browser or the like. Portal 115 further provides user interface 121, also usually a GUI, whereby user 102 may access applications 140. User interface 121 may include screens or web pages for accessing or providing functionality related to a single application 140, or for more than one application 140. For example, functionality related to a billing application 140 and also to a provisioning application 140 may be combined together within a single screen or webpage of user interface 121. Accordingly, user 102 may advantageously simultaneously access the two applications 140 where ordinarily the user 102 might be required to log in to the two applications 140 separately with separate user names and passwords.

Interfaces 120 and 121 may be rendered according to various ways of programming web pages, such as Java Server Pages (JSPs). Further, using server technologies, e.g., Enterprise Java Beans (EJB) and the like, data such as queries, responses to requests for information, etc., may be processed, e.g., submitted applications 140, databases 145, and/or data stores 167 and 190, discussed further below with reference to FIGS. 3 and 4.

Portal 115 generally includes authentication layer 125, authorization layer 130, and/or data access layer 135, each discussed in more detail below, to provide for access to applications 140 by user 102. Similarly, portals 116 and 117 include authentication layers 126 and 127 respectively. In the embodiment illustrated in FIG. 1B, portals 116 and 117 further each include respectively authorization layers 131 and 132. However, it is possible for authorization layers 131 or 132 to be included in one or more applications 140. Further, in the illustrated embodiment, applications 140a and 140b, accessible through portal 116, include data access layers 136 and 137 respectively. However, it should be understood that data access layers 136 and 137 are not necessary for accessing applications 140a and 140b through integration portal 115 because, for users accessing applications 140 through portal 115, data access may be determined by data access layer 135 in portal 115. Portal 117 includes data access layer 138, thereby negating any need for such to be included in applications 140 accessible through portal 117. As discussed below, data access layers 135 and 138 may be synchronized, that is, changes to data access layer 138 may be updated to data access layer 135 and vice versa.

Authentication layers 125, 126, and 127 generally include program instructions such as are known for authenticating user 102 to portals 115, 116, and 117, respectively, e.g., by requiring entry of a login identifier and a password for user 102, by checking a digital certificate, by verifying an Internet Protocol (IP) address for computer 103, etc.

Authorization layers 130, 131, and 132 generally include data and program instructions to provide for access by user 102 to specified functionality in one or more applications 140 that user 102 has been authorized to access.

Data access layers 135, 136, and 137 generally include data and program instructions to provide for access by user 102 to one or more specific sets of data in applications 140. Data access layers 136 and 137 are included in applications 140a and 140b respectively, and accordingly include instructions only for accessing data in the relevant application database 145. Data access layer 135 is discussed in more detail below with reference to FIG. 3. Certain applications 140 may allow all users 102 accessing the application 140 to access all data that may be provided by the application 140, and therefore do not need a data access layer, as is illustrated in FIG. 1A with respect to application 140c accessed via portal 116.

Queue manager 142, illustrated in FIG. 1B, supports sending and receiving messages between portal 115 and applications 140 by providing for asynchronous communications between portal 115 and applications 140. Also, as discussed further below, queue manager 142 provides for portal 115 to receive data updates from databases 145. In one embodiment, queue manager 142 includes IBM WebSphere MQ sold by International Business Machines Corp. of Armonk, N.Y.

Computer 103 may include any one of a number of computing devices, including, without limitation, a computer workstation, a desktop, notebook, laptop, or handheld computer, or some other computing device as is generally known, such as a Java-enabled cellular telephone or similar device. Computing devices such as the foregoing may employ any of a number of computer operating systems, including, but in no way limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computer 103 can include client applications such as web browser to permit access to portal 115, as well as a display, input devices, memory, storage, etc. as needed to provide for access to portal 115.

Portal 115, and also portals 116 and 117, generally include both hardware, including computing devices, and software for communicating with computer 103 and also applications 140. For example, in an embodiment, portal 115 includes one or more server computers provided with relational database and web server software, and also software that includes program instructions for providing administration interface 120, and also layers 125, 130, and 135. Such server computers may be provided with any of the computer operating systems mentioned above, or some other computer operating system. Portal 115 generally further includes storage devices such as disk arrays or the like attached to computing devices such as the afore-mentioned server computers. Also, it should be understood that portal 115 generally includes input devices, displays, network connections, and other peripherals necessary to support the functioning of portal 115.

Web server software enables a computing device within portal 115 to respond to requests from a web browser installed on computer 103, e.g., hypertext transfer protocol (HTTP) requests. Such Web server software, in conjunction with program instructions included in authentication layer 125, authorization layer 130, and/or data access layer 135, generally provides for communicating with applications 140, and for requesting and retrieving information from databases 145.

Applications 140 may communicate with portal 115 and databases 145 through a network such as a LAN (not shown), network 110, or some other network. Although not shown in FIG. 1, it will be understood that applications 140 generally run on one or more server computers provided with hardware peripherals and operating systems such as those mentioned herein. Applications 140 are generally each associated with a database 145, and in fact it is to be understood that applications 140 and databases 145 may be combined. Embodiments are also possible is which portal 115 accesses one or more databases 145 directly. For purposes of understanding illustrated embodiments, it is important to understand simply that applications 140 and databases 145 together generally support a particular business function or set of functionality. For example, an application 140 may be a billing system, a repair tracking system, an ordering system, etc.

With respect to relational databases included within portal 115 and/or databases 145, relational database software generally refers to a relational database management system (RDBMS), as is known. An RDBMS generally employs the known Structured Query Language (SQL) in addition to a language for creating, storing, editing, and executing stored procedures, such as the PL/SQL language mentioned above. However, it is to be understood that databases 145 may be some other kind of database such as a hierarchical database, a set of files, an application database in a proprietary format, etc. Each database 145 generally includes a computing device employing a computer operating system such as one of those mentioned above, and are accessed via a network in any one or more of a variety of manners, as is well known. Embodiments are possible in which at least some of databases 145 are both included in one RDBMS or are located within a single computing device.

Computer 103 and one or more computing devices included within portal 115 may each include instructions executable by one or more computing devices such as those listed above. Such instructions may be compiled or interpreted from computer programs created using a variety of programming languages and/or technologies, including, without limitation, and either alone or in combination, Java™, C, C++, Visual Basic, Java Script, Perl, etc. For example, one embodiment includes Enterprise Java Beans (EJBs) and stored procedures written in the PL/SQL language provided by Oracle Corporation of Redwood Shores, Calif. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

As mentioned above, portal 115 includes authentication layer 125, authorization layer 130, and/or data access layer 135. In embodiments discussed herein, portal 115 includes each of layers 125, 130, and 135, although embodiments are contemplated in which not all of layers 125, 130, and 135 are present. Some identification of users 102 by authentication layer 125 is generally necessary. However, it is to be understood that embodiments are possible in which authorization layer 130 is omitted, and in which access to applications 140 by user 102 is determined solely by the entitlements provided through data access layer 135. Similarly, data access layer 135 may be omitted from portal 115, in which case users 102 may be given access to all data and/or functionality included within applications 140 that each user 102 is authorized to access.

In embodiments disclosed herein, users 102 generally may access applications 140 through portal 115. Applications 140 are generally but not necessarily remote from portal 115, i.e., accessed through a network such as a LAN, WAN, etc. Users 102 are thereby provided access to diverse applications 140 through a single portal user interface 121 common to all applications 140 that may be accessed through portal 115. By providing such unified access to applications 140, portal 115 provides user 102 with a simpler and more efficient way to access applications 140 than would be available to user 102 if it were necessary to access applications 140 separately, or through different portals 116 and 117, and therefore to be authenticated, authorized, and entitled to diverse applications 140 separately. For example, because portal user interface 121 is common to multiple applications 140, user 102 need not remember multiple login names and passwords, nor need user 102 remember multiple ways of accessing multiple applications 140, e.g., multiple uniform resource locators (URLs) or web addresses.

Figure 2:
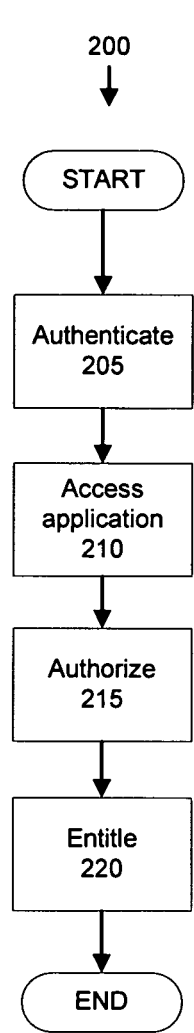
FIG. 2 illustrates an exemplary process for authenticating, authorizing, and entitling users of a portal.

FIG. 2 illustrates an exemplary process 200 for authenticating, authorizing, and entitling users 102 of the portal 115. It should be understood that user interactions with portal 115 as described with reference to process 200 occur through user interface 121.

Figure 4:
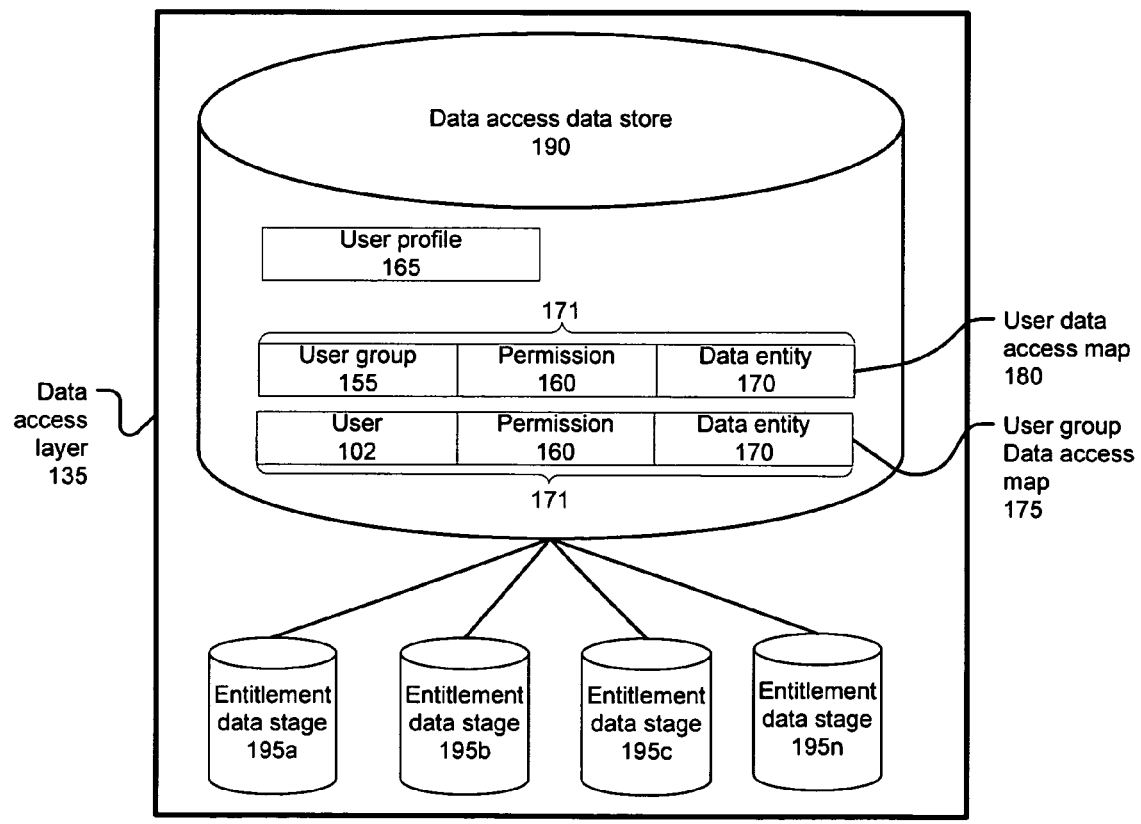
FIG. 4 provides a detailed view of an authentication layer, according to an embodiment.

The following sections discuss the steps of the process 200 in detail. However, a brief overview of process 200 may be helpful before providing the following detailed discussion. Briefly, process 200 begins with step 205, in which user 102 is authenticated to portal 115, e.g., by providing a user name and password to portal 115 through interface 121. Next, in step 210, user 102 is authorized to access items, e.g., features and/or functions, in one or more applications 140. Permissions 160, discussed in more detail below with reference to FIG. 4, are generally determined according to the username and password provided in step 205, and do not require further user interaction with portal 115 through user interface 121. Next, in step 215, portal 115 determines user 102 data access entities 171, also discussed in more detail below. Next, in step 220, user 102 is provided access to authorized applications 140 through portal user interface 121. Process 200 ends after step 220.

Process 200 will now be discussed in further detail. First, in step 205, user 102 is authenticated by portal 115. Authentication layer 125, as mentioned above, is known for authenticating users 102 to portal 115. Authentication layers 126 and 127, in portals 116 and 117, respectively, generally operate in a similar fashion to authentication layer 125. For example, it is common to require users accessing applications over the World Wide Web of the Internet, etc. to provide a login identifier and password before access is permitted. Generally a user 102 enters a login identifier and a password in a form provided through user interface 121. The entered login identifier and password are then checked against a database of users 102 permitted to access portal 115. Such database of users 102 may be protected by known security mechanisms, including storing login and password data concerning users 102 in encrypted form.

In one embodiment, the eTrust® SiteMinder software product sold by Computer Associates of Islandia, N.Y. is used to provide authentication of users 102 to portal 115. Further, mechanisms such as digital certificates may be used to authenticate users 102. Users 102 having digital certificates may provide portal 115 with a digital key that may be processed by portal 115, e.g. using a hashing technique or the like, to authenticate user 102. In general, authentication layer 125 or some similar mechanism is generally necessary to uniquely and definitively identified user 102 so that authorization and data access may take place as provided for by authorization layer 130 and data access layer 135 respectively.

Although not illustrated in FIG. 2, it should be understood that if portal 115 is unable to authenticate the user 102 and step 205, process 200 will terminate. However, assuming that user 102 is successfully authenticated and step 205, step 210 is executed next.

Continuing with process 200, in step 210, portal 115 provides user 102 with requested access to one or more applications 140, whereupon a user may request access to one or more application entities 161, meaning that authorization or authorizations 162 are determined as described hereinafter. However, unless user 102 is entitled to see all of the data presented by the requested applications 140, portal 115 next determines data access entities 171 of user 102 to access data included in applications 140 and/or databases 145, as described below with respect to step 220.

In step 215 of process 200, portal 115 determines application entities, i.e., features and/or functions such as menus, menu items, API calls, etc., in applications 140 that user 102 is authorized to access. Such determination is generally made by use of authorization layer 130. By determining such application entities, portal 115 is thereby able to present in user interface 121 features and/or functionality relating to one or more applications 140. In cases where an application entity relates to more than one application 140, an authorization 162 for user 102 to access such application entity may be determined transparently to user 102, and may be determined at one time for such application entity that may be applicable to more than one application 140.

Figure 3:
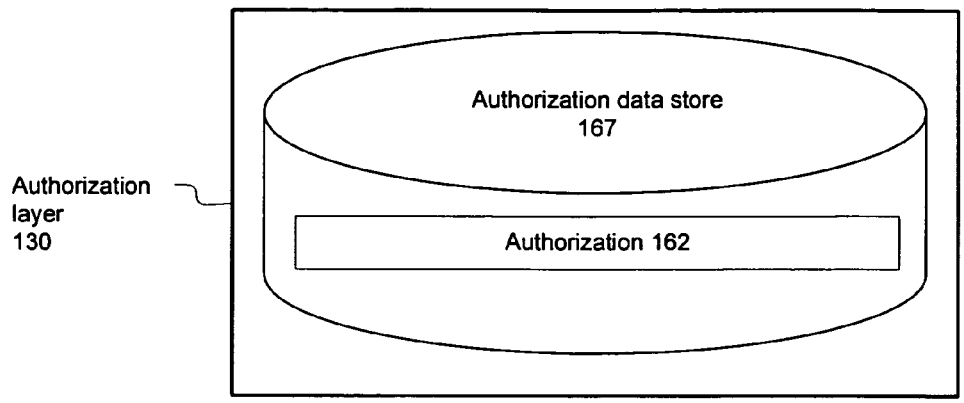
FIG. 3 provides a detailed view of an authorization layer, according to an embodiment.

FIG. 3 illustrates authorization layer 130, according to an embodiment. Authorization layer 130 is described in further detail in co-pending application Ser. No. 11/584,111 entitled "INTEGRATED APPLICATION ACCESS," filed the same day as the present application, assigned to the assignee of the present application, and fully incorporated by reference herein in its entirety. By querying authorization data store 167 or the like, portal 115 may determine authorization or authorizations 162 associated with user 102, i.e., the application entity or entities that a user 102 is authorized to access, and the manner in which the user 102 is authorized to access such application entities. Such a determination may be used to govern the presentation of one or more applications 140 to user 102, e.g., as takes place in step 215.

Continuing with the description of process 200, if portal 115 determines that user 102 is not authorized, i.e., is not associated with any authorizations 162 to access any applications 140, then process 200 will terminate following step 210, although such termination is not illustrated in FIG. 2. On the other hand, if user 102 is associated with one or more authorizations 162, i.e., user 102 is authorized to access one or more applications 140, then generally process 200 proceeds to step 215 wherein user 102 is presented with requested application entities.

Further, as was noted above, embodiments are possible in which authorization layer 130 is omitted entirely. As will be apparent, step 215 will also be omitted in such embodiments. Accordingly, in these embodiments, process 200 will proceed directly from step 210 to step 220. In such embodiments, users 102 may be allowed to access all entitlement entities 161 that are available through portal 115, but may be restricted to accessing only data to which they are entitled as described below with respect to step 220. Moreover, in embodiments in which data access layer 135 is omitted, process 200 ends after step 215.

In step 220, portal 115, using data access layer 135, determines data access entities 171 for user 102. FIG. 4 provides a detailed view of data access layer 135, according to an embodiment.

Data access entity 171 includes permission 160 and data entity 170. In the context of data access entity 171, permission 160 may include indicators that a user 102 may view, modify, update, delete, add to, etc. data that is included within the data access entity 171.

Data entity 170 is a mechanism for including data within a data access entity 171, and is simply an identifier for a subset of data in applications 140 and/or databases 145, e.g., a record or set of records in tables in databases 145. For example, data entities in a billing system may include a "subscriber" data entity 170, whereby each subscriber represents a customer or subscriber billed by the system. In this example, data access entity 171 may include a data entity 170 identifying a subscriber, or, if the subscriber data entity 170 exists in a hierarchy whereby subscribers are included in "subscriber groups," data entity 170 may include an identifier for a subscriber group. Generally, data entity 170 identifies data that is of interest only to a particular user or set of users 102. Further, data identified by data entity 170 in a data access entity 171 is generally the only data that a user 102 associated with the data access entity 171 should be allowed to access in applications 140. That is, data access entity 171 effectively serves as mechanism to prevent users 102 from accessing data that they are not entitled to access in addition to providing users 102 with access to data that they are entitled to access.

Although not illustrated in FIG. 4, but as discussed below and illustrated in Table 1, it is possible to include more than one data entity 170 in a data access entity 171. That is, for a given user 102, a given permission 160 may apply to more than one data entity 170. For example, a first data entity 170 in data access entity 171 may refer to a set of billing data, and a second data entity 170 in data access entity 171 may refer to a set of repair data.

Further, it may be desirable to include additional fields in data access entity 171 to accommodate multiple data entities 170 referencing different subsets of the same data. For example, a customer service representative may be entitled to view a first set of billing data, a second set of billing data, etc. An example of a data access entity 171 including multiple data entities 170 is provided below in Table 1. Because each data access entity 171 generally includes only one user 102 and one permission 160, but may include multiple data entities 170 (although only one is illustrated in FIG. 4), an identifier or key uniquely associated with each data access entity 171 is a combination of an identifier for the user 102 and the permission 160 included in the data access entity 171, according to an embodiment.

Similar to authorization layer 130, data access layer 135 provides two separate mechanisms for determining an association between user 102 and data access entity 171, whereby portal 115 may determine whether user 102 is entitled, or has permission, to access specified data in application 140 and/or database 145. According to a first mechanism, user group data access map 175 associates user groups 155 with data access entities 171. According to a second mechanism, user data access map 180 associates users 102 with data access entities 171. Alternatively or additionally, data access entities 171 may be stored directly in user profile 155, but preferably are stored in user data access map 180 or user group data access map 175.

User group data access map 175 and user data access map 180 each may be embodied as tables in a relational database such as data access data store 190. Each data access entity 171 is represented by a record, or row, in a table in a relational database such as user group data access map 175 or user data access map 180. In many embodiments, data access data store 190 and authorization data store 167 are included within the same relational database. Data access data store 190 is generally populated and updated by data access data stages 195, which in turn are populated and updated by databases 145. In an embodiment, data access data stages 195 have a one-to-one correspondence with databases 145. A process by which data access entities 171 in databases 145 are synchronized with information in data stages 195, is discussed below with reference to FIG. 6, data access entities 171 from data stages 195 in turn being used to update and populate maps 175 and 180 in data access data store 190.

As mentioned above, data access entity 171 serves as an indicator associated with an application 140 that indicates that user 102 is permitted to access data through applications 140. For example, data entity 171 may refer to billing data, and therefore users 102 in a billing department should be permitted access to the billing data, as should users of a call center application 140, whereas users 102 of a repair application 140 should not be granted such access. Accordingly, users 102 in a billing department and in a call center should be associated with a data access entity 171 granting access to billing data, whereas users 102 in the repair department should not be granted such access. However, note that billing department users 102 and call center department users 102 may be associated with different data access entities 171 that each include a data entity 170 reference in the same set of billing data. That is, different data access entities 171 including the same data entity 170 may include different permissions of 160, e.g., giving billing department users 102 the ability to modify data identified by data entity 170, while giving call center department users 102 the ability to view such data. Of course, in such a scenario, billing department users 102 would also be associated with the data access entity 171 providing the ability to view the set of billing data identified by data entity 170.

Table 1 below provides an example of fields that may be included in data access entity 171.

user 102 to view data included in data entities 170. "Subscriber code 1" and "subscriber code 2" are data entities 170 referring to a particular subscriber account whose records a user 102 is entitled to view. "Product code is a data entity 170 referring to a product concerning which a user 102 is permitted to view data.

Portal 115 may include programming instructions, e.g., in an Enterprise Java Bean (EJB), one or more stored procedures, etc., to retrieve data access entity 171 and determine a set of data that may be presented to a user 102 through applications 140. A process for determining data access entity 171 is discussed in more detail below with reference to FIG. 5.

User data access map 180 may be used to determine what data access entities 171, if any, user 102 is associated with. Determination of data access entity 171 is discussed in more detail below with reference to FIG. 5. However, user data access map 180 may be queried according to program instructions in portal 115, e.g., in an EJB, to find a unique combination of a user 102 identifier and data access entity 171. Further, user group data access map 175 is generally used to associate user group 155 with data access entity 171. Determining user 102 data access entities 171 according to user group data access map 175 is similar to using user group map 150 as discussed above. For any user group 155 found in a user profile 165, it is possible to query user group map 150 to determine what data access entities 171, if any, the user group 155, and thereby a user 102 having a user profile 165 including the user group 155, is associated with. In an embodiment, the combination of user group 155 and data access entity 171 may be used to locate data access entities 171 pertaining to a user 102 who is a member of user group 155.

Exemplary layouts for user group data access map 175 and user data access map 180 are similar, a main difference being that instead of the "User ID" element, group data access map 175 includes a "User Group ID" element. However, as discussed in more detail below, user group data access map 175 and user data access map 180 may be populated quite differently. In an embodiment, user group data access map 175 may be populated according to instructions provided by an administrator through administration interface 120, while user data access map 180 may be populated from updates provided to data access data store 180 according to stored procedures executed from application databases 145.

Returning again to process 200, in step 220, user 102 accessing applications 140 according to the authorizations determined in step 210 is provided with requested data according to data access entities 171.

Following step 220, process 200 ends.

TABLE 1

| Element | Element Definition | Example Data |
| --- | --- | --- |
| Data access ID | Unique identifier for data access entity 171; in an embodiment a combination of identifiers for a user 102 and a permission 160. | billing123; order_entry789; agr78g89 |
| Subscriber code1 | Identifier for a first subscriber account whose data records user 102 may be permitted to see. | abc123; company_name |
| Subscriber code2 | Identifier for a second subscriber account whose data records user 102 may be permitted to see. | abc123; company_name |
| Product code | Identifier for a product concerning which user 102 may be permitted to see data. | abc123; product_name |

Figure 5:
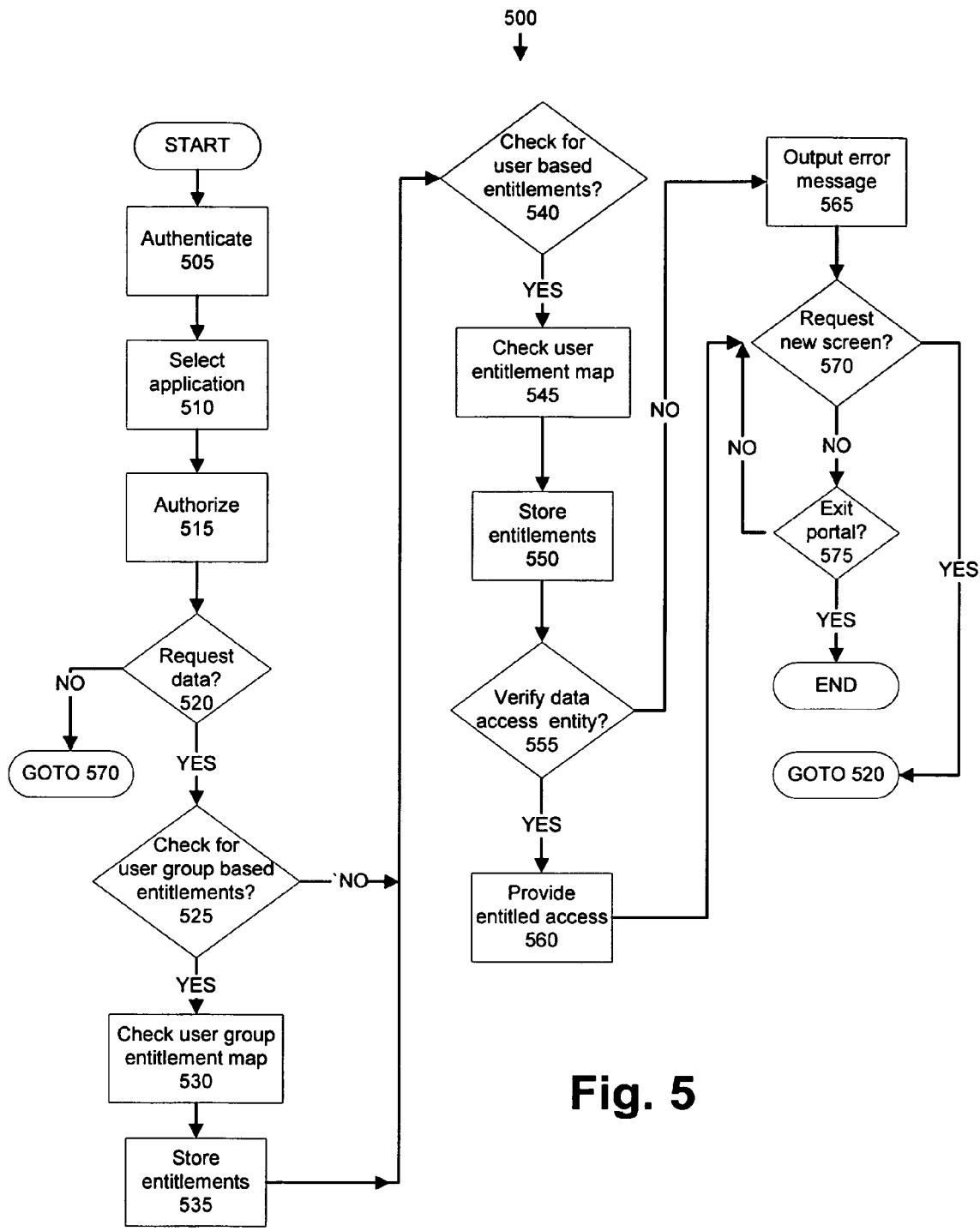
FIG. 5 illustrates an exemplary process for determining an entitlement entity or entities associated with a user.

In Table 1, "data access ID" provides a unique identifier for a data access entity 171. In an embodiment, a data access ID is provided by a combination of an identifier for user 102 and permission 160. For example, permission 160 may entitle FIG. 5 illustrates an exemplary process 500 for determining a data access entity or entities 171 associated with user 102, thereby determining items such as data and/or functionality that user 102 is entitled to access in application 140.

Steps 505, 510, and 515 are substantially similar to steps 205, 210, and 215 described above with reference to process 200. From the perspective of the user 102, step 505 requires entry of a user name or login identifier, and password. In step 510, portal 115 provides user 102 with access to a requested application 140, as described above with respect to step 215 of process 200, which may require an authorization or authorization 162, provided as discussed with reference to step 215. For example, the user may be presented with a screen or page in the user interface 121 that provides a list of applications, data, etc. that the user 102 may access in portal 115. Upon making such a selection, the user 102 is provided with the requested access subject to authorization or authorizations 162 verified in step 515. A process for obtaining and verifying authorizations 162 is discussed in more detail in the above-referenced co-pending application Ser. No. 11/584,111 entitled "INTEGRATED APPLICATION ACCESS."

Following step 515, in step 520, it is determined whether user 102 has requested to access data through user interface 121. For example, user interface 121 may present user 102 with options to view various data entities 170. User 102 might request a report, enter a query, or request to see some other portion of user interface 121 providing data from an application 140 and/or database 145. If it is determined that user 102 has not requested to access data through application 140, process 500 proceeds to step 570, where it is determined whether user 102 has requested a new screen presenting a different set of data entities 170. However, if user 102 has requested to access data through portal 115, step 525 is executed next.

In step 525, it is determined whether portal 115 is to check for data access entities 171 according to a user group 155. Step 525 is optional. In some embodiments, portal 115 may always check for data access entities 171 according to user group 155, while in other embodiments user groups 155 may not be included, and therefore such a check would not make sense. However, in some cases it may be possible for portal 115 to determine, e.g., according to a user identifier or other information in a user profile 165, whether data access entities 171 may be associated with a user group 155 to which the user 102 belongs. If it is determined that portal 115 should check for data access entities 171 according to a user group 155, step 530 is executed next. Otherwise, step 540 is executed next.

Next, in step 530, portal 115 identifies user group or groups 155 to which user 102, authenticated and authorized in steps 505 and 510, belongs, if any, such identification perhaps having taken place in step 510 above. Portal 115 generally supports both users 102 who do not belong to any user groups 155 as well as users 102 who do belong to one or more user groups 155. There are a number of different ways in which portal 115 may determine whether user 102 belongs to one or more user groups 155. For example, information concerning user groups 155 may be stored in user profile 165, or portal 115 may check user group map 150 to determine whether user 102 may be found. In any event, in step 515, portal 115 determines whether, for user 102, it should determine whether any data access entities 171 exist based on a user group 155 to which user 102 belongs. If not, process 500 proceeds to step 535. However, if portal 115 is to determine whether any data access entities 171 exist for user 102, then step 520 is executed next.

In step 535, portal 115 queries user group data access map 175 to determine data access entities 171 for user group 155 including user 102, and stores data access entities 171 for user 102 in memory or some other medium, e.g., using a session variable or the like. In one embodiment, an Enterprise Java Bean (EJB) may be instantiated for storing, and providing portal 115 with access to, data access entity 171. Accordingly, when portal 115 needs to determine whether user 102 is entitled to access particular data, it may call the EJB that includes data access entity 171 by passing in an identifier for the item, e.g., data, menu items, API methods, etc., that user 102 wishes to access, to determine whether such access may be granted.

In the embodiment illustrated by FIG. 5, step 540 is visited regardless of whether it has been determined in step 515 not to check for data access entities 171 for user 102 according to user group 155. However, embodiments are possible in which, after checking for data access entities 171 according to user group 155 including user 102, portal 115 then omits to check for data access entities 171 that are specifically associated with user 102 and not with user group 155. Further, in some embodiments, if it has been determined not to check for data access entities 171 according to user groups 155 in step 520 above, it is simply assumed that portal 115 should check for data access entities 171 according to the identity of user 102.

In step 540, portal 115 determines whether to check for data access entities 171 pertaining to user 102 simply according to the identity of user 102. Such determination may be made according to information in a user profile 165, according to information encoded into an identifier for user 102, or according to other rules programmed into portal 115. In any event, assuming such a check for data access entities 171 is to be made, step 535 is executed next. Otherwise, step 545 is executed next. It should be noted that portal 115 is preferably programmed so that at least either steps 530 and 535 or 545 and 550 are executed, i.e., so that data access entities 162 are checked according to at least one of user 102 and user group 155.

In step 545, portal 115 queries user data access map 180 to determine data access entities 171 for user 102 in application 140. As noted above, data access entities 171 are generally keyed to a combination of user 102 and permission 160.

Next, in step 550, data access entities 171 relating to user 102 are then stored in memory or some other medium as described above with respect to step 525. Step 545 is executed following step 540.

Next, in step 555, data access entity 171 is verified according to the request for data made by the user or on behalf of the user in step 520. Data access entity 171 may be accessed, e.g., a call may be made to an EJB, to determine what data user 102 is entitled to access through application 140. If it is determined in step 555 user 102 is entitled to the requested data, then step 560 is executed next. Otherwise, step 565 is executed next.

In step 560, the GUI for application 140, e.g., user interface 121, displays the data requested in step 520.

In step 565, which is executed if data access entity 171 could not be verified in step 555, an error or message or the like may be displayed to user 102.

In step 570, a determination is made as to whether user 102 has requested a new screen or web page in user interface 121. If not, process 500 proceeds to step 575. Otherwise, process 500 returns to step 510.

In step 575, a determination is made as to whether user 102 has requested to exit portal 115, or whether an indication that user 102 has exited portal 115 has been received in another manner, e.g., by a session variable or the like timing out. If such a determination is made, then process 500 ends. Otherwise, process 500 returns to step 515.

Figure 6:
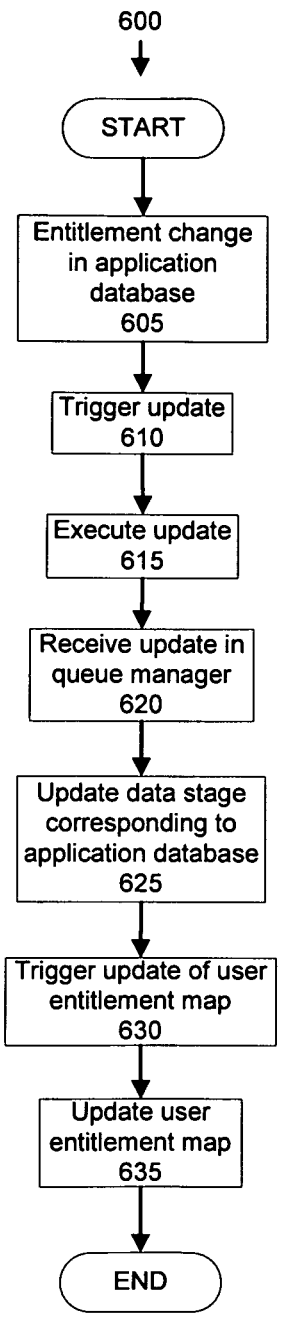
FIG. 6 illustrates an exemplary process for updating a data access data store.

FIG. 6 illustrates an exemplary process 600 for updating data access data store 190. As such, process 600 depicts synchronization of data access layer 135 in integration portal 115 with applications 140 and their associated application databases 145, possibly including data access layers 136 and 137 that are local to applications 140. However, it should also be understood that a similar synchronization occurs in many embodiments between portal data access layers 135 and 138, using the same or similar mechanisms to those described with reference to FIG. 6. Further, synchronization may occur between data access layers 136 and 137 in applications 140. Such synchronization may occur via network 110, some other network, or some other link or connection between computing devices hosting applications 140 and/or databases 145.

In step 605, data access entity 171 is revised, added to, or deleted from database 145, data access entity 171 pertaining to application 140 associated with database 145. Such revisions or additions of data access entity 171 and database 145 may occur in a variety of ways. For example, an administrator of application 140 may add user 102 to a list in database 145 of users 102 authorized to access application 140, and may further add to database 145 information concerning one or more data access entities 171 granted to user 102 with respect to application 140. It is also possible to provide an administrator of portal 115 with the ability to add user 102 as an authorized user in database 145, and further with the ability to grant one or more data access entities 171 to user 102 with respect to application 140. Similarly, administrators of either application 140 or portal 115 may be provided with the ability to delete users 102 from database 145, or to grant or revoke data access entities 171 to users 102 included in database 145. In any event, the requirements of step 605 are met when data access entity 171 is added to, revised in, or deleted from database 145.

Next, in step 610, an update mechanism in database 145 is triggered to update data stage 195 corresponding to database 145 with the information changed in step 605. The update mechanism is generally a set of program instructions included in application 140 and/or database 145. For example, in an embodiment, the update mechanism is a stored procedure included in database 145. The stored procedure may be triggered in a variety of ways. For example, in the foregoing embodiment, the stored procedure is triggered according to a periodic, e.g., once every 24 hours, request sent through queue manager 142 from the corresponding update data stage 195. Other kinds of update mechanisms may also be used. For example, it is possible for database 145 to store all information relating to changed data access entities 171 in a file, e.g., using a stored procedure, and to provide such file to a corresponding update data stage 195 using file transfer protocol (FTP). Similarly, various kinds of Web services may be utilized to provide information relating to changed data access entities 171 to corresponding update data stage 195.

Next, in step 615, the update mechanism triggered in step 610 is executed in database 145. For example, as noted above, a stored procedure in database 145 may send information concerning changed data access entities 171 queue manager 142 in portal 115. Ways of sending, queuing, and receiving messages and queue manager 142, e.g., using IBM's Websphere MQ, are known.

Next, in step 620, queue manager 142 receives the information sent by database 145 in step 615, and stores it in a queue of messages received from one or more databases 145.

Next, in step 625, queue manager 142 provides the information sent by database 145 in step 615 to the corresponding update data stage 195. Receipt of a message from queue manager 142 providing data access entity 171 change information triggers an update mechanism in update data stage 195, e.g. a stored procedure, to update a table or tables in update data stage 195 that include data access entity 171 information relating to application 140 and user 102. In some embodiments, update data stage 195 includes only information concerning changed data access entities 171, and is purged of all data after updating data access data store 190 as described below. It is also possible for update data stage 195 to include all information concerning data access entities 171 relating to application 140, and for update data stage to therefore be essentially copied over to data access data store 190.

Next, in step 630, an update mechanism in update data stage 195 is triggered to provide the data access entity 171 change information received in step 625 to data access data store 190. Again, the update mechanism may be provided in a variety of ways, frequently according to a stored procedure executed in a database including data stage 195. Further, the trigger for the update mechanism may be provided in a variety of ways, such as according to scheduling program that triggers the update mechanism on a periodic, e.g., once every 24 hours, basis, or the trigger may be event-based, e.g., based on updates being made to a particular table included in data stage 195.

Next, in step 635, user data access map 180 in data access data store 190 is updated with the changed data access entity 171 information stored in update data stage 195 as described above with respect to step 625. User group data access map 175 is generally updated in a fashion similar to that described for user data access map 180 in steps 630 and 635.

Following step 635, process 600 ends.

Figure 7:
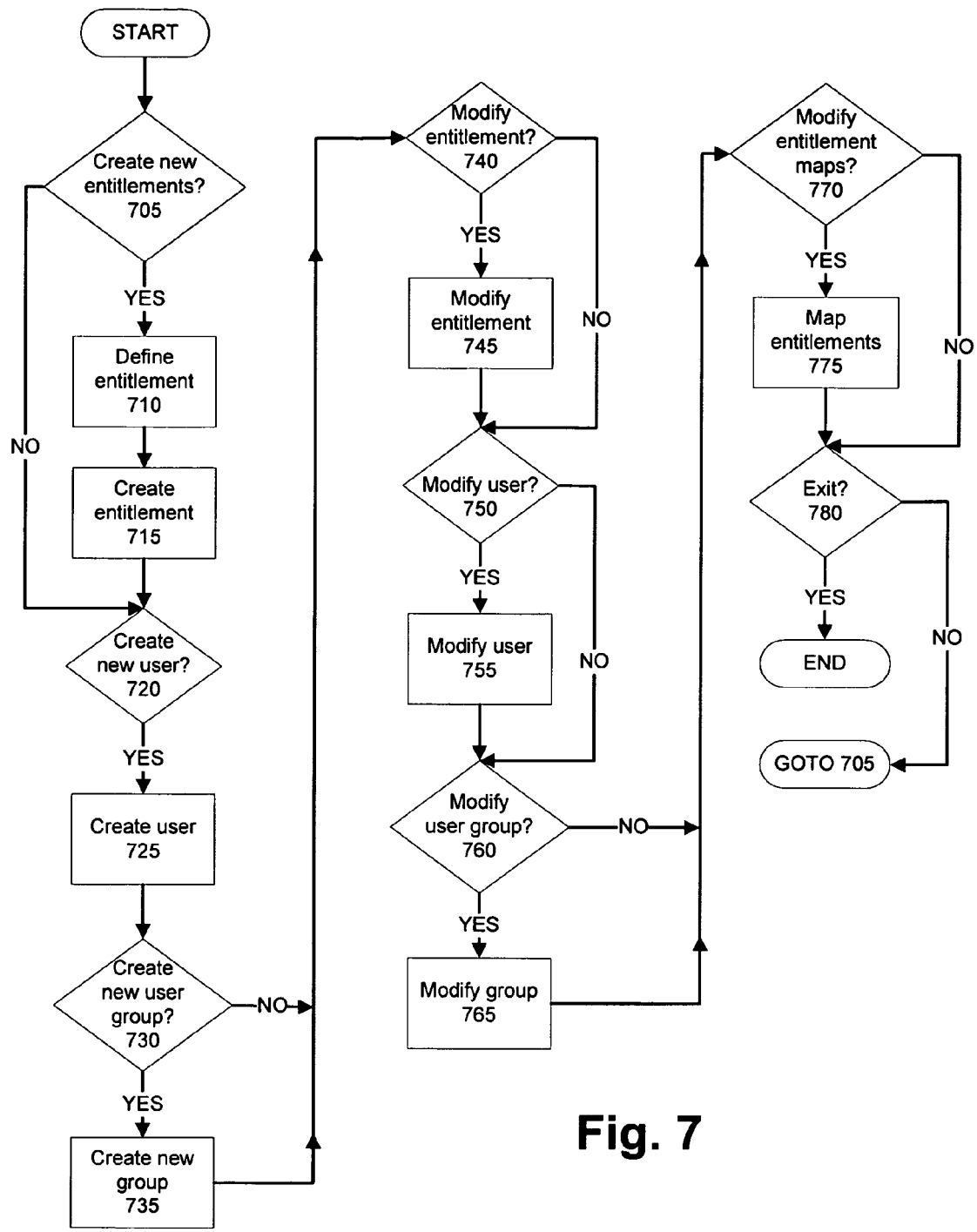
FIG. 7 illustrates an exemplary process for using an administration interface.

FIG. 7 illustrates an exemplary process 700 for using administration interface 120.

In step 705, portal 115 determines whether an administrative user 102 viewing administration interface 120 has entered a selection to create a new data access entity 171. Such a selection may be entered by choosing a menu option, or the like. Note that an administrative user 102 may access portal 115 using a computer included in or directly connected to portal 115 rather than through network 110, although access by an administrative user 102 through network 110 may also be possible. If user 102 has selected to create a new data access entity 171, step 710 is executed next. Otherwise, step 720 is executed next.

In step 710, portal 115 defines the data access entity 171 to be created. As noted above, in an embodiment, data access entity 171 may pertain to a specified set of data. Depending on the set of data to be specified, portal 115 may invoke different program instructions in step 715 below in creating data access entity 171. For example, different program instructions would be used to specify a set of data pertaining to customer accounts, as opposed to a set of data pertaining to products. In any event, the selection of an administrative user 102 to create data access entity 171 provided in step 705 above generally includes an indication of a set of data to be included in data entity 170 for data access entity 171.

Next, in step 715, portal 115 creates data access entity 171 by creating a record in user data access map 180 and/or user group data access map 175 including a user 102 or user group 155 as appropriate, a permission 160, and the data entity 170.

In step 720, it is determined whether user 102 of administration interface 120 has selected to create a new user 102 for portal 115. If so, process 725 is executed next. Otherwise, step 730 is executed next.

In step 725, portal 115 accepts input through administration interface 120 providing information to create a new user 102, and saves the information in a user table or the like, and also saves information in other relevant stores, such as user group map 150, user group data access map 175, and user data access map 180. Information concerning a new user 102 includes items to populate a user profile 165, such as a user name, a password, permissions 160, identifiers for user groups 155 to include the new user 102, data access entities 171 granted to the new user 102, etc. Once such information has been stored in the appropriate tables or the like, process 700 proceeds to step 730.

In step 730, it is determined whether input has been received from user 102 to create a new user group 155. If so, step 735 is executed next. Otherwise, step 740 is executed next.

In step 735, portal 115 accepts input through administration interface 120 providing information to create a new user group 155, and saves the information in a user group table or the like, and also saves information in other relevant stores, such as user group map 150. Input may also have been provided for associating the new user group 155 with permissions 160 and/or data access entities 171, in which case user group data access map 175 and/or user data access map 180 may also be updated. Following step 735, process 700 proceeds to step 740.

In step 740, it is determined whether input has been received from user 102 of administration interface 120 to modify a data access entity 171. If so, step 745 is executed next. Otherwise, step 750 is executed next.

In step 745, data access entity 171 is modified according to instructions received from user 102. It should be understood that modification of data access entity 171 may include deletion of data access entity 171 from portal 115, including removing data access entity 171 from user group data access map 175 and user data access map 180. Other modifications to data access entity 171 may include substituting a different permission 160 and/or data entity 170 into data access entity 171. Process 700 proceeds to step 750 following step 745.

In step 750, it is determined whether input has been received from user 102 of administration interface 120 to modify user 102, e.g., to modify information in user profile 165 such as that provided above as described with respect to step 725, to modify user data access map 180 associating user 102 with data access entities 171, etc. If such input has been received, process 700 proceeds to step 755. Otherwise, step 760 is executed next.

In step 755, user profile 165, user data access map 180, etc., are updated according to the input received in step 750. Further, it should be understood that information concerning user 102, such as information concerning data access entities 171 associated with user 102 in data access map 180, may be updated in other ways. For example, as described above with respect to process 600, information concerning data access entities 171 granted to user 102 may be updated in portal 115 according to information received from database 145.

In step 760, it is determined whether input has been received from a user 102 of administration interface 120 to modify user group 155. If so, step 765 is executed next. Otherwise, step 770 is executed next.

In step 765, user group 155 is modified according to input received in step 760. Such modification may include deletion of user group 155. Further, user group 155 may be modified by associating additional permissions 160 with user group 155 and user group map 150, or by removing authorizations associated with user group 155 from user group map 150. Data access entities 171 associated with user group 155 in user group data access map 175 may be similarly modified.

In step 770, portal 115 determines whether user 102 has selected an option in administration interface 120 to modify either user group data access map 175 or user data access map 180. If so, process 700 proceeds to step 775. However, if such input has not been received from user 102, step 780 is executed next.

In step 775, according to input received from user 102 of administration interface 120, user group data access map 175 and/or user data access map 180 are modified. For example, a user 102 could be newly associated with a pre-existing data access entity 171 in user data access map 180. Similarly, user group 155 could be associated with a pre-existing data access entity 171 in user group data access map 175. Further, such mappings could be deleted from user data access map 180 and/or user group data access map 175.

In step 780, it is determined whether input has been received to exit administration interface 120. If so, process 700 ends. Otherwise, process 700 returns to step 705.

The processes, systems, methods, heuristics, etc. described herein have been disclosed in the context of system 100. However, the descriptions provided herein are intended to be illustrative and not restrictive, and it is to be understood that the processes, systems, methods, heuristics, etc. described herein could be equally applicable to testing other systems.

Further, with regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

We claim:

1. A system, comprising:
an integration portal that includes at least one computing device and selectively provides a user access to data associated with one or more applications among a plurality of applications, the plurality of applications including a first set of applications accessible through a first portal and not accessible through a second portal and a second set of applications accessible through the second portal and not accessible through the first portal, the one or more applications being accessible through the integration portal regardless of whether the one or more applications are included in the first set of applications or the second set of applications, the one or more applications being remote from the user and the integration portal, and the data being stored in another computing device that is remote from the user and the integration portal and that is associated with the one or more applications; and a data access layer that is included in the integration portal and that includes:

a map associating the user with a permission and further associating a combination of the user and the permission with a data entity specifying a set of data within the data associated with the one or more applications;

wherein the integration portal is configured to use the map to determine that the user is permitted to access the set of data specified by the data entity; and wherein the map included in the data access layer in the integration portal is synchronized with access information maintained in a remote data store such that the map included in the data access layer in the integration portal represents the access information in the remote data store, the access information in the remote data store specifying the user, the set of data, and that the user has permission to access the set of data.

2. The system of claim 1, wherein the set of data comprises one or more records in a table in a relational database.

3. The system of claim 1, wherein the integration portal is configured to synchronize the map included in the data access layer in the integration portal with the access information maintained in the remote data store by updating the data entity in the map to reflect a change to the set of data specified by the access information in the remote data store.

4. The system of claim 1, wherein the user is associated with the permission according to a user group with which the user is associated.

5. The system of claim 1, further comprising a user interface included in the integration portal and that provides a remote computer associated with the user and connected to the integration portal by a network with access to the data.

6. The system of claim 1, wherein the first portal selectively accesses data associated with the first set of applications accessible through the first portal on behalf of the user or on behalf of a second user in accordance with the access information maintained in the remote data store.

7. The system of claim 6, further comprising a data access layer included in the first portal, wherein the remote data store is part of the data access layer included in the first portal and whereby the first portal determines whether the user or the second user is permitted to access the data associated with the first set of applications accessible through the first portal.

8. The system of claim 6, wherein the remote data store is part of a data access layer included in the first portal.

9. The system of claim 6, wherein the remote data store is part of a data access layer included in the first set of applications accessible through the first portal.

10. The system of claim 1, wherein:

the access information comprises a data access entity specifying the user, the set of data, and a permission of the user to access the set of data; and the map comprises a copy of the data access entity.

11. The system of claim 1, further comprising a data stage included in the integration portal and that receives a message provided by the remote data store, the message containing update information representing at least one change to the access information included in the remote data store, updates one or more tables in the data stage with the update information, and provides the update information to the data access layer included in the integration portal;

wherein an update mechanism within the data access layer updates the map with the update information received from the data stage.

12. The system of claim 11, wherein the update mechanism in the data access layer is triggered to update the map on at least one of a periodic basis and an event-based basis.

13. The system of claim 11, wherein the update information represents a change to the set of data specified by the access information in the remote data store.

14. The system of claim 1, further comprising an authentication layer that is included in the integration portal for authenticating the user to the integration portal.

15. The system of claim 1, wherein the communication between the integration portal and the one or more applications is asynchronous.

16. A method, comprising:

maintaining, by an application integration portal that includes at least one computing device and selectively provides a user access to data associated with one or more applications among a plurality of applications, the plurality of applications including a first set of applications accessible through a first application portal and not accessible through a second application portal and a second set of applications accessible through the second application portal and not accessible through the first application portal, the one or more applications being accessible through the integration portal regardless of whether the one or more applications are included in the first set of applications or the second set of applications, the one or more applications being remote from the user and the integration portal, and the data being stored in another computing device that is remote from the user and the integration portal and that is associated with the one or more applications, a data access layer within the application integration portal, the data access layer including:

a map associating the user with a permission and further associating a combination of the user and the permission with a data entity specifying data associated with the one or more applications;

accessing, by the application integration portal, the data on behalf of the user, the accessing of the data including using the map to determine that the user is permitted to access the data specified by the data entity; and synchronizing, by the application integration portal, the map within the data access layer of the application integration portal with access information maintained in a remote data store such that the map included in the data access layer in the application integration portal represents the access information in the remote data store, the access information in the remote data store specifying the user, the data, and that the user has permission to access the data.

17. The method of claim 16, wherein the data comprises one or more records in a table in a relational database.

18. The method of claim 16, wherein the synchronizing includes the application integration portal updating the data entity in the map to reflect a change to the data specified by the access information in the remote data store.

19. The method of claim 16, wherein the user is associated with the permission according to a user group with which the user is associated.

20. The method of claim 16, further comprising accessing, by the first application portal in accordance with the access information maintained in the remote data store, data associated with the first set of applications accessible through the first application portal on behalf of the user or on behalf of a second user using the first application portal.

21. The method of claim 20, wherein the remote data store is maintained in one of the first application portal and an application database in which the data is stored.

22. The method of claim 16, embodied on a non-transitory computer-readable medium as a set of computer-executable instructions.

23. The method of claim 16, further comprising maintaining, by the application integration portal, an authentication layer within the application integration portal for authenticating the user to the application integration portal.

24. A method, comprising:
  maintaining, by a computing device, a data access layer within an integration portal that selectively provides a user access to a set of data associated with one or more applications among a plurality of applications, the plurality of applications including a first set of applications accessible through a first portal and not accessible through a second portal and a second set of applications accessible through the second portal and not accessible through the first portal, the one or more applications being accessible through the integration portal regardless of whether the one or more applications are included in the first set of applications or the second set of applications, the one or more applications being remote from the user and the integration portal, and the data being stored in another computing device that is remote from the user and the integration portal and that is associated with the one or more applications, wherein the data access layer includes:
    a map associating the user with a permission and further associating a combination of the user and the permission with a data entity specifying the set of data associated with the one or more applications the integration portal configured to use the map to determine that the user is permitted to access the set of data specified by the data entity and to provide the user access to the set of data specified by the data entity; and synchronizing, by the computing device, the map within the data access layer of the integration portal with access information maintained in a data store that is separate of the integration portal such that the map within the data access layer of the integration portal represents the access information in the separate data store, the access information in the separate data store specifying the user, the set of data, and that the user has permission to access the set of data.

25. The method of claim 24, wherein the access information in the separate data store is configured to be used by the first portal to determine that the user is permitted to access the set of data specified by the access information and to provide the user access to the set of data specified by the access information.

26. The method of claim 24, wherein:

the access information comprises a data access entity specifying the user, the set of data, and a permission of the user to access the set of data; and the map comprises a copy of the data access entity.

27. The method of claim 24, further comprising maintaining, by the computing device, an authentication layer within the integration portal for authenticating the user to the integration portal.

* * * * *